Figure 1:
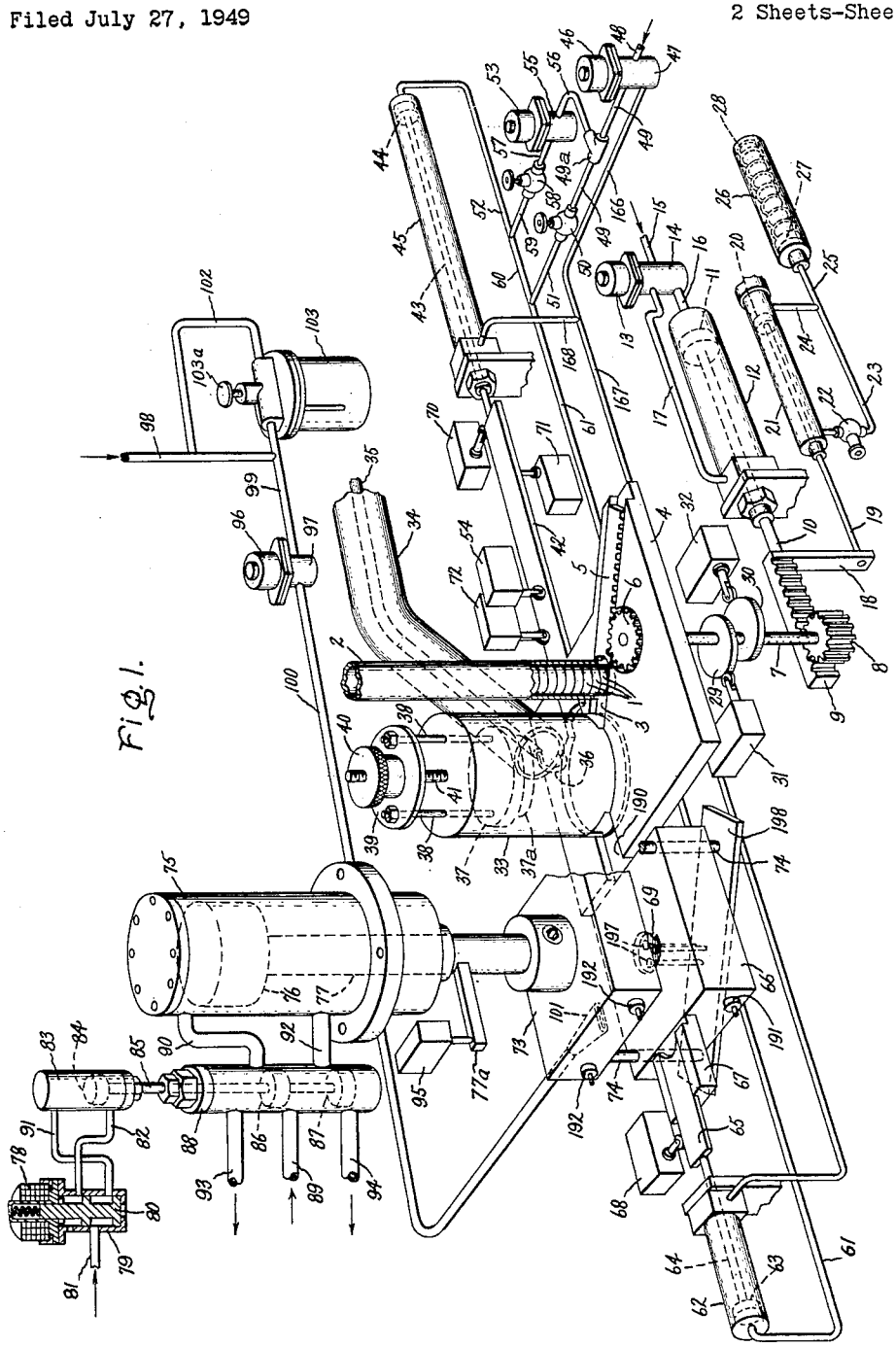

July 26, 1955  T. N. WILLCOX  2,713,697
MOLDING MACHINE
Filed July 27, 1949  2 Sheets-Sheet 1

Inventor:
Thomas N. Willcox,
by [signature]
His Attorney.

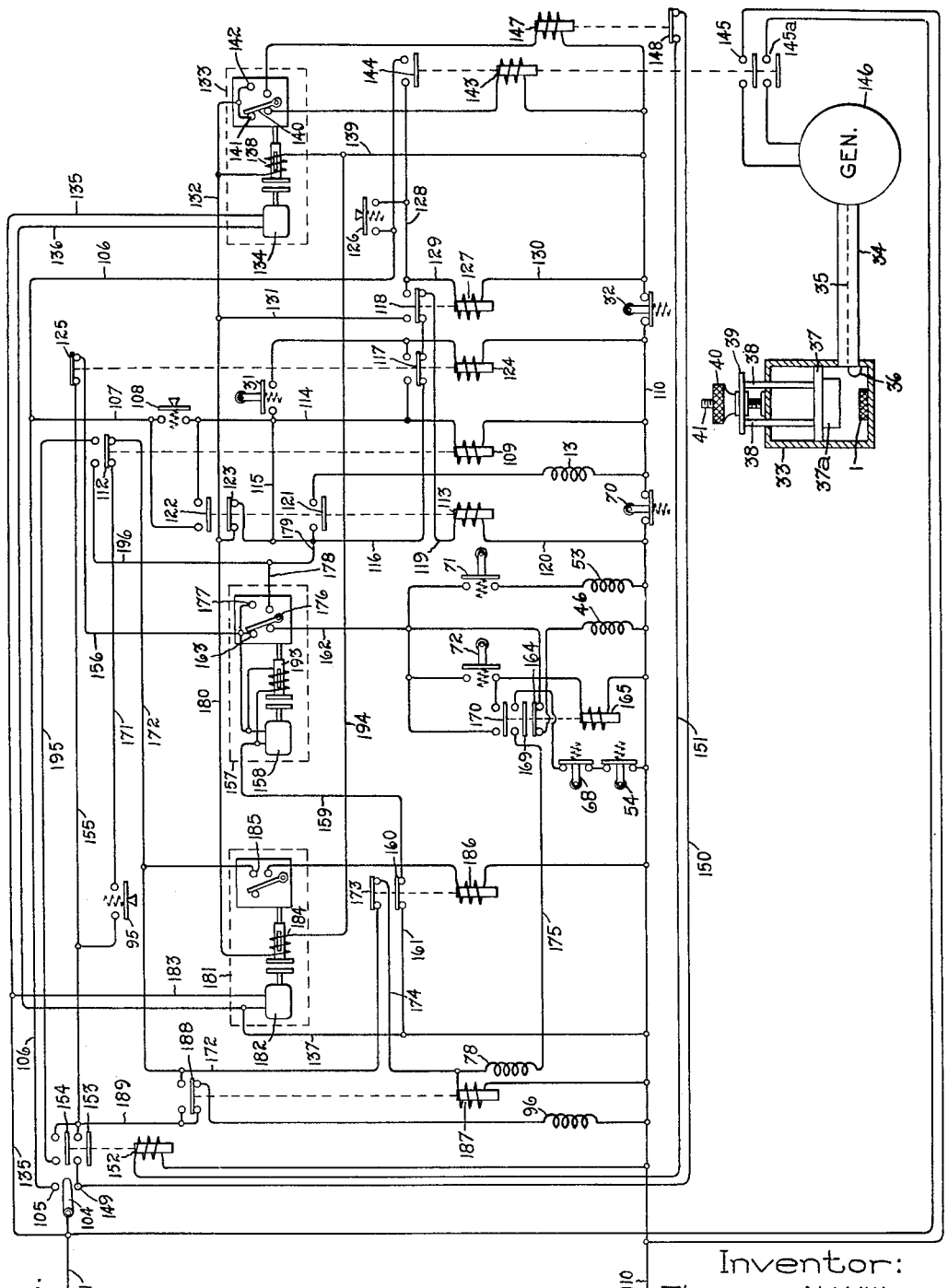

2,713,697
Patented July 26, 1955

2,713,697
MOLDING MACHINE

Thomas N. Willcox, Pittsfield, Mass., assignor to General Electric Company, a corporation of New York Application July 27, 1949, Serial No. 107,098

7 Claims. (Cl. 18—5)

My invention relates to molding machines, more particularly to machines for molding articles of thermosetting plastic material, and has for its principal object the provision of a reliable and efficient machine which preheats, molds, cures, and discharges from the machine finished articles of this type of material.

Another object of the invention is to provide an automatic molding machine for thermosetting plastic materials in which an ultra high frequency electromagnetic field is utilized for preheating individual charges of the material being molded before the charges are inserted in the mold.

A further object of my invention is the provision of an apparatus which preheats the charges to molding temperature, thus starting the curing process, before the charges are placed in the mold, whereby the subsequent heating and curing time in the mold is substantially reduced.

A still further object of my invention is the provision of improved means for inserting a unitary workpiece into a resonant cavity heating chamber and removing it from the chamber quickly after it has been heated.

In carrying out my invention in one form, I provide a resonant cavity preheating chamber, a stack of pellets of the material to be molded adjacent thereto, and a loading mechanism for automatically pushing one of the pellets into the preheating chamber at selected intervals. In the preheating chamber, the pellet is heated for a predetermined time after which a transfer mechanism automatically transfers the pellet to a press comprising a heated mold and heated ram. A positioning device coacts with the transfer mechanism to locate the pellet accurately in the mold. The heated hydraulic ram then exerts pressure on the pellet, causing it to assume substantially the shape of the mold. The ram maintains pressure on the material in the mold for a sufficient length of time that the pressure, together with the heat from the mold and ram, cures the material into a finished molded article. After the curing is completed, the ram retracts and the molded article is automatically ejected from the mold, following which it is removed from the machine by means of a blast of air. During the molding and curing operation, another pellet is heated in the preheating chamber and is ready to be inserted in mold as soon as the preceding pellet is ejected. Thus, the machine produces finished molded articles continuously and automatically.

For a clearer and more complete understanding of my invention, reference should be had to the accompanying drawing, Fig. 1 of which is a schematic diagram in perspective of one preferred embodiment thereof; while Fig. 2 is an electrical circuit diagram of this embodiment of the invention.

Referring to Fig. 1 of the drawing, a stack of preformed charges or pellets 1 of the material to be molded is shown positioned in a vertical tubular retainer 2. The lowermost of the pellets 1 rests in a recess 3 in a base plate 4. Also located in recess 3 is a pusher 5 having teeth on one side which mesh with corresponding teeth on a pinion 6 to form a rack and pinion mechanism. Pinion 6 is located in a circular recess in base plate 4 and is driven through a shaft 7 by a second rack and pin mechanism composed of pinion 8 and rack 9. Rack 9 is joined to and operated by a piston rod 10 and a piston 11 in an air cylinder 12. Piston 11 is operated by a solenoid 13 which, when energized, moves a valve 14 to admit air under pressure from an air conductor 15 to air conductor 16 and thence into cylinder 12 on the side of piston 11 opposite the piston rod. This causes piston 11 to move from the quiescent position, in which it is illustrated in Fig. 1, to the opposite end of the cylinder, causing the loading mechanism including pusher 5 to make one forward stroke. In order to return pusher 5 to its original position, solenoid 13 is deenergized, causing valve 14 to cut off the air pressure from conductor 16 and transfer it to conductor 17, which admits air to cylinder 12 on the piston rod side of the piston 11 and causes the latter to return to its original position.

A member 18 is secured to piston rod 10 at the point where it is joined to rack 9. Member 18, which projects downward, is joined near its lower extremity to a piston rod 19 which, in turn, is joined to a piston 20 in a hydraulic cylinder 21. The latter cylinder and its piston and piston rod, together with an additional hydraulic cylinder 26 having a spring loaded piston 27 therein, comprise a dash-pot mechanism which causes piston 11 to move slowly in the forward direction and rapidly in the reverse direction. It is important that piston 11 move slowly in the forward direction so that pusher 5, which is operated thereby, will not push the pellet so rapidly that the inertia of the pellet will cause it to overshoot the desired location in the preheating chamber. When piston 11 operates in the forward direction, piston 20 is operated in the same direction, causing the hydraulic fluid, with which cylinder 21 is filled, to flow through a needle valve 22, a fluid conductor 23 and a fluid conductor 24, back to cylinder 21 on the opposite side of piston 20. By adjustment of the valve 22, the pressure on the piston rod side of piston 20 during a forward stroke can be controlled and this, in turn, determines the forward speed of piston 11 and, hence, of pusher 5. During a reverse stroke, fluid is forced by piston 20 from the side opposite the piston rod through conductor 24 and a conductor 25 into cylinder 26. In cylinder 26 piston 27 is biased by a spring 28, permitting it to absorb the fluid expelled by the piston 20 during the reverse stroke, so that the reverse stroke is made rapidly. Then, after the stroke has been completed, spring 28 causes the fluid gradually to return through conductors 25 and 23 and valve 22 to the piston rod side of the piston 20.

A complete forward movement of piston 11, piston rod 10 and the associated rack and pinion mechanisms, including pusher 5, causes the shaft 7 to rotate through substantially half of a complete revolution. This causes two cams, 29 and 30, which are positioned on shaft 7, to make half a revolution. This, in turn, causes two switches, 31 and 32, which are operated by the cams, to be closed and opened respectively, the two switches being shown in the opposite, or open and closed positions, respectively, in Fig. 1. The functions of switches 31 and 32 are described in detail later.

When piston 11 is operated through a forward stroke in the manner described above, pusher 5 engages the lowermost pellet 1 and pushes it into a preheating chamber 33 having walls made of electrically conducting material, by sliding it on to the lower wall or floor thereof through a suitable opening in the side wall. The lower wall or floor of chamber 33 may be formed by means of a circular recess in base plate 4, the said lower wall being the flat bottom surface of the recess, and this bottom surface preferably being substantially horizontal and coplanar with the bottom of recess 3 for pusher 5 and also coplanar with the bottom of another recess 190 for another pusher 42 which is discussed in detail hereinafter. By the use of this arrangement, a pellet may be introduced into the preheater by sliding it on to the floor thereof, and may be transferred from the chamber to a mold after being heated also by sliding it along the floor. Chamber 33 is of the resonant cavity type and is supplied with ultra high frequency energy through a concentric conductor transmission line composed of an outer conductor 34 and an inner conductor 35. Ultra high frequency energy which may, for example, be at a frequency of approximately 915 megacycles per second, is coupled into the heating chamber by a suitable means, such as loop 36, whereby standing electromagnetic waves are set up in the heating chamber. Pellet 1, which is located by the pusher substantially in the center of the heating chamber on the lower surface thereof, is heated by the electric component of the electromagnetic field, thus created. A tuning device comprising an adjustable member 37 within the heating chamber connected by means of rods 38 to an adjustable plate 39 located above the heating chamber, is provided to adjust the electromagnetic field for varying heating conditions. If desired, member 37 may be provided with a depending cylindrical portion 37a to aid in securing the most effective electric field distribution in the heating chamber. Plate 39 is adjusted by turning a threaded knurled knob 40 on a correspondingly threaded rod 41 projecting from the top of heating chamber 33. Longitudinal and radial movement of coupling loop 36 may also be provided, if desired, to assist in the tuning of the resonant cavity to accommodate pellets or charges of varying shape and composition.

After the pellet 1 has been heated in preheater 33 for a predetermined length of time, a second pusher 42, which operates in a recess 190 in base plate 4 through suitable openings in the vertical walls of the preheating chamber, moves forward and engages the pellet. Pusher 42, which may be called the transfer pusher and is part of the transfer mechanism, is operated by a piston rod 43 and a piston 44 in an air cylinder 45. To operate pusher 42 in the forward direction, a solenoid 46 is energized to operate a valve 47 and cause it to admit air under pressure from conductor 48 to conductor 49, thence through conductor 49 and T connector 49a, through a needle valve 50, a conductor 51, a conductor 60 and a conductor 52 into cylinder 45 on the side of the piston 44 opposite the piston rod. This causes piston 44 to move pusher 42 forward until the pusher has engaged the pellet 1 in the preheater, this movement being relatively slow due to the adjustment of needle valve 50. After the pusher 42 has engaged the pellet, another solenoid 53 is energized through the action of a switch 71 which is operated by pusher 42 after it has progressed a sufficient distance in the forward direction. Solenoid 53 operates a valve 55 to admit additional air from the source through a conductor 56 to a conductor 57, thence through a needle valve 58, a conductor 59 and conductor 52 to cause piston 44 to move rapidly in the forward direction.

The opening of valve 46 also admits air through conductor 49, valve 50 and conductor 51 to a conductor 61, which transmits it to an air cylinder 62 at the opposite end of the machine. In cylinder 62 are a piston 63 and piston rod 64, which are joined to a pellet positioning member 65. When air pressure is applied to piston 63 on the surface opposite the piston rod, the piston and piston rod are caused to move forward, which moves member 65 forward toward a recess 69 in a heated mold 66. Member 65 is guided by a recess in a horizontal projection 67 on the mold 66. After member 65 has moved forward a sufficient amount, it opens a switch 68, the function of which is described later.

After pusher 42 has engaged a pill, or pellet 1, in the preheating chamber, it slides the pellet toward cavity 69 in the mold 66, the upper surface of mold 66 preferably being coplanar with the surface of the bottom of recess 190 so that the heated pellet can be moved by sliding from the preheater to the mold cavity. Pusher 65 moves simultaneously toward the cavity from the opposite side of the mold and coacts with pusher 42 to position the preheated pellet accurately in cavity 69. As pusher 42 moves forward toward the cavity, it operates switches 70, 54 and 72 at various points in its travel, in addition to switch 71 which was mentioned previously. The function of these switches is explained in detail later in conjunction with a description of the operation of the electrical control circuits of the molding machine. To cause pusher 42 and member 65 to retract to their original positions, solenoid 46 is deenergized. This causes valve 47 to admit air to a conductor 166, from which air pressure is transmitted through air conductors 167 and 168, respectively, to cylinders 62 and 45, causing pistons 63 and 44 to return to their original positions. Simultaneously with this admission of air to the reverse ends of cylinders 62 and 45, the operation of valve 47 also provides a vent to relieve the air pressure in the forward ends of these cylinders to enable the pistons to move in the reverse direction.

After a preheated pellet 1 has been positioned in cavity 69 in the heated mold 66 and members 42 and 65 have withdrawn, a hydraulic motor operates and causes a heated ram 73 to descend and apply pressure to the pellet. The ram 73 is guided by vertical guide rods 74 which project downwardly from diagonal opposite corners of ram 73. The pressure by ram 73 causes the material of which the preform, or pellet, is made to assume substantially the shape of mold cavity 69. The hydraulic motor which operates ram 73 is composed of a cylinder 75, a piston 76 and a piston rod 77. The hydraulic motor is operated by a solenoid 78 which, when it is energized, operates an air pilot valve 79 by raising a piston 80. This admits compressed air from a conductor 81 to a conductor 82, from where it goes into an air cylinder 83 on the piston rod side of a piston 84. This causes piston 84 to raise piston rod 85 which, in turn, raises piston-like projections 86 and 87 in 4-way hydraulic valve 88. The upward movement of projection 86 admits a hydraulic fluid, such as oil, under pressure, from a supply conductor 89 into cylinder 88, from which it passes into a conductor 90, thence into cylinder 75 on the top side of piston 76, causing the latter to move downward. The downward movement of piston 76 moves piston rod 77 and ram 73, which is connected thereto, downward.

To cause piston 76 to move upward to its original position, subsequently, solenoid 78 is deenergized, permitting member 80 to drop to the lower position in which it is shown in Fig. 1. This admits air under pressure from conductor 81 to a conductor 91 which, in turn, admits the air to the upper surface of piston 84, causing this piston to move downward. This causes piston 86 in valve 88 to close the port leading to conductor 90 and simultaneously causes piston 87 to open the port leading to a conductor 92. Conductor 92 admits oil under pressure from conductor 89 into cylinder 75 on the lower side of piston 76, which causes the latter to move upward. A return line 93 to an oil reservoir is provided near the top of cylinder 88 for the oil which is discharged from the top of cylinder 75 during the upward, or return, stroke. Another return line 94 is provided near the lower end of cylinder 88 for the oil which is discharged from below piston 76 during the downward stroke thereof. As piston rod 77 is moved upward and downward, a projection 77a thereon operates a switch 95, the function of which is described in detail later; switch 95 is open when ram 73 is down, in the closed position, and closed when the ram is in the raised position.

After the ram 73 has applied pressure to the material in the mold cavity 69 and formed it to the desired shape, it maintains pressure on the formed part for a predetermined interval. This pressure, together with the heat of mold 66 and ram 73, cures and sets the material of which the part is formed. Mold 66 is heated by two cartridge type electrical heating units 191 which are embedded in the mold. The terminals of one of these two heating units can be seen in Fig. 1. Ram 73 is heated by two similar cartridge heating units 192 which are embedded therein.

After the completion of the curing process, ram 73 is raised, the molded part is ejected from the mold cavity, and a blast of air is utilized to remove the molded part from the machine. The molded part is ejected from the mold cavity by three knockout pins 197 which are actuated by an actuating bar 198; the pins move in suitable openings in mold 66. Actuating bar 198 is affixed to guide rods 74 which pass through openings in the mold and are affixed to and move with ram 73. Rods 74 are of such a length that actuating bar 198 is caused to strike knockout pins 197 and cause these pins to project slightly above the bottom of mold cavity 69 when ram 73 reaches its topmost position. Thus, the molded part is raised out of the mold cavity sufficiently to be removed by a blast of air. The blast of aid to remove the part from the machine is created by energizing a solenoid 96, which opens an air valve 97 and admits air under pressure from a conductor 98 through a conductor 99, valve 97 and a conductor 100 to a nozzle 101, from which it is blown across the mold and mold cavity. The air blast cleans the mold, in addition to removing the formed part, with the air blast also being utilized to apply lubricant to the mold for the next operation. This is done by means of a by-pass 102 on air supply conductor 98, in which a lubricating device 103 is connected. Device 103, which contains lubricant in a liquid form, has an orifice in the top portion and a small vertical tube with the lower end immersed in the lubricant associated therewith whereby, by means of the Venturi effect, the device causes a small amount of lubricant to be injected into the air stream which is used to clean the mold. The amount of lubricant is adjustable by means of a needle valve 103a with which the lubricating device is provided.

During the time that a molded part is curing in the mold, another preform or pellet 1 is being heated in preheating chamber 33. The timing of the control mechanism for the molding machine is such that the latter preform is at the proper temperature and ready to be transferred to mold cavity 69 as soon as the previous part has been ejected and the mold cleaned and lubricated. Thus, the molding machine produces finished molded parts continuously and automatically from the stack of pellets.

Reference should now be had to Fig. 2 of the drawing in conjunction with the following description of the operation of the control circuits of the molding machine. To initiate operation of the machine, a pellet, or pill 1, is introduced into the preheating chamber by manual operation and is heated by application of heat through manual control means. Then, the machine is transferred to automatic operation, and the pellet is transferred to the mold where it is formed and cured. In the meantime, another pellet is automatically inserted in the preheating chamber and heated and thereafter the machine operates automatically.

The entire control system is supplied with single phase alternating current electrical energy of conventional voltage and frequency through a pair of conductors 110 and 111. To transfer a pellet from the stack of pellets in retainer 2 to the preheating chamber 33, a switch member 104, which is connected to conductor 111, is moved into engagement with a contact 105 to prepare the control system for manual operation. This energizes a conductor 106 and a connecting conductor 107. Then, when a push-button 108 is depressed, a solenoid 109 is energized by the closing of a circuit from push button 108 through a conductor 114 and through the coil of solenoid 109 to conductor 110. When solenoid 109 is energized, it operates a switch 112, the function of which is explained later.

When push button 108 is depressed, it also energizes a solenoid 113 through a circuit which can be traced from push button 108 through conductor 114, a conductor 115, a conductor 116, the lower contacts of switches 117 and 118, a conductor 119, thence through the coil of solenoid 113 and a conductor 120 to conductor 110. When solenoid 113 is energized, switches 121 and 122 are closed and switch 123 is opened. The closing of switch 122 provides a shunt hold-in circuit around push button 108, which is of the momentary contact type; this circuit is maintained until the lower contacts of switch 117 are subsequently opened. The closing of switch 121 energizes solenoid 13, which is connected to air valve 14, and thereby controls the supply of compressed air for operating the chamber loading mechanism.

The energization of solenoid 13 causes valve 14 to admit air into cylinder 12 and causes piston 11 to make a complete forward stroke, as explained previously. This, in turn, causes rack 9 and pusher 5 to make a complete forward stroke with the result that the latter pushes the lowermost pellet in the stack into approximately the center of preheating chamber 33. The forward stroke of the loading mechanism also causes cam 30 on shaft 7 to open switch 32 as soon as the motion of shaft 7 begins, and cam 29 on this shaft to close switch 31 at substantially the point of full forward travel of pusher 5. When switch 31 closes, it energizes a solenoid 124, which moves switch 117 to the upper position, closing the upper contacts, and opening the lower contacts thereof. The opening of the latter contacts breaks the circuit to solenoid 113, opening switch 121, thereby deenergizing solenoid 13 and allowing air valve 14 to assume its original position. This causes air pressure to be applied through air conductor 17 on the piston rod side of piston 11 in cylinder 12 and restores the entire pellet loading mechanism to its original position. The de-energizng of solenoid 113 also opens switch 122 and thereby removes the shunt around push button 108.

When solenoid 124 is energized and raises switch 117 to the upper position, the upper contacts of switch 117 cause solenoid 124 to hold itself in, through a circuit including conductors 115 and 114 which is described later. This is necessary because switch 31 is closed only momentarily at the forwardmost limit of pusher 5. As soon as pusher 5 starts to retract, switch 31 is opened again. The effect of the operation of an additional switch 125, which is opened when solenoid 124 is energized, is explained later.

A charge having been placed in the preheating chamber 33 and the loading mechanism restored to its starting position, the next step is to heat the charge to substantially molding temperature to start the curing process and prepare it for molding. This is done by depressing a momentary contact push button 126, which also receives current from conductor 106. This energizes a solenoid 127 through conductors 128 and 129, with the circuit being completed to main conductor 110 by a conductor 130. The portion of conductor 110 to which conductor 130 is connected is energized providing switches 32 and 70 in conductor 110 are closed, and these two switches are closed providing loader 5 and pusher 42 have both withdrawn from the preheating chamber and are in their original quiescent positions. When solenoid 127 is energized, switch 118 is raised to the upper position. Through the upper contacts of switch 118, a circuit is completed from conductor 128 through a conductor 131 and a conductor 132 to a timing mechanism 133. Timing mechanism 133 includes a synchronous motor 134 which operates continuously, being connected to the source of electrical energy for the control system by means of a conductor 135, which is connected to main conductor 111, and a conductor 136, which is connected to another conductor 137 which connects to main 110. When conductor 132 is energized, a circuit is completed through the coil of a magnetic clutch 138, which energizes the clutch and causes it to engage the shaft of motor 134. This causes timer 133 to begin a predetermined cycle.

During the first part of the timing cycle of timer 133, contacts 141 are joined by a conductive switch member 140 which completes a circuit from conductor 132 through the coil of a solenoid 143, thus energizing this solenoid. When solenoid 143 is energized, it closes a switch 144, which is in shunt with push button 126, and, hence, provides a hold-in circuit which causes solenoid 127 and solenoid 143 to remain energized as long as contacts 141 in the timer remain closed. The energizing of solenoid 143 also closes two switches 145 and 145a, which control the supply of energy for a high frequency generator 146. This causes generator 146 to transmit high frequency energy to heating chamber 33 through concentric conductor transmission line 34, 35 as long as switches 145 and 145a remain closed. As stated previously, generator 146 may be of the magnetron type operating at a frequency of approximately 915 megacycles per second, although other types of generators and other frequencies may be used if desired.

When timer 133 reaches a selected point in its cycle, contact member 140 is moved, opening contacts 141 and closing contacts 142. The opening of contacts 141 de-energizes solenoid 143 which, in turn, de-energizes solenoid 127, and generator 146 which cuts off the supply of heating energy to preheating chamber 33. When contacts 142 are closed, a solenoid 147 is energized, opening a switch 148. The opening of switch 148 has no effect as long as the molding machine is being operated manually, but when it is operating automatically the opening of switch 148 signifies the completion of one cycle and the beginning of the next. This is explained in greater detail in connection with the automatic operation of the machine. Switch 148 is opened only momentarily, inasmuch as timer 133 permits contacts 142 to remain closed for only a short interval, member 140 then being restored to its original position to prepare timer 133 for another cycle.

Assuming now that switch 148 is again closed, switch member 104 may be moved into engagement with a contact 149 to begin automatic operation of the molding machine. When switch 104 engages contact 149, a circuit is completed through a conductor 150, switch 148 and a conductor 151, which energizes a solenoid 152. Solenoid 152 closes switches 153 and 154. The closing of switch 153 completes a circuit through a conductor 155, switch 125 and a conductor 156 to a timer 157. When conductor 156 is energized, a synchronous motor 158 in the timer is caused to rotate by the completion of a circuit through the motor and, thence, through a conductor 159, a switch 160 and a conductor 161 which joins conductor 137, completing the circuit through motor 158 to main conductor 110. The coil of a magnetic clutch 193 is connected in shunt with motor 158 and is energized simultaneously therewith, causing the clutch to engage the shaft of motor 158 and start the operation of timer 157 immediately. The energizing of conductor 156 simultaneously energizes a conductor 162 through contacts 163, which completes a circuit to the coil of solenoid 46 through a switch 164, thus energizing solenoid 46. Solenoid 46 opens air valve 47, which admits air to cylinder 44 causing transfer pusher 42 to move forward and engage the heated pellet in chamber 33. The opening of air valve 47 also admits air to cylinder 62 which causes positioning member 65 to move forward toward cavity 69 in mold 66.

When transfer pusher 42 contacts pellet 1 in the preheating chamber, it is important that pusher 42 be moving at a relatively slow speed, in order that the pellet will not be jarred out of correct alignment by the sudden blow. It is also important, however, that the charge be transferred as quickly as possible to the mold cavity once it is heated; therefore, the transfer mechanism is arranged so that a switch 71 is closed by pusher 42 as soon as the latter has engaged the heated charge. The closing of switch 71 energizes solenoid 53. The latter opens valve 55 and supplies additional compressed air to cylinders 45 and 62, thus accelerating transfer pusher 42 and positioning member 65. Pusher 42 and positioning member 65 are arranged so that at the forwardmost limits of their respective travels the preheated charge is positioned between them directly over mold cavity 69.

When pusher 42 reaches the end of its forward travel, it closes a switch 72, which energizes a solenoid 165, opening switch 164, and de-energizing solenoid 46, thus restoring air valve 47 to its original position. This causes compressed air to be supplied through air conductor 166 and conductors 167 and 168, respectively, to reverse ends of cylinders 45 and 62, which causes pusher 42 and positioning member 65 respectively to retract to their original positions. When solenoid 165 is energized, it closes switches 169 and 170, in addition to opening switch 164. The closing of switch 170 causes solenoid 165 to hold itself in as long as contacts 163 in timer 157 remain closed. It will be noted that the circuit through switch 72 remains closed only momentarily while pusher 42 is at the forward end of its travel. As soon as pusher 42 moves in the reverse direction, switch 72 is again opened.

The closing of switch 169 by solenoid 165 completes a circuit which energizes solenoid 78 which, in turn, operates the hydraulic motor for the ram 73 as soon as all interlocking switches are also closed. This circuit may be traced from conductor 155 through switch 95, a conductor 171, the lower contacts of switch 112, a conductor 172, a switch 173, a conductor 174, the coil of solenoid 78, a conductor 175, switch 169, switch 68 and switch 54. Of the switches included in this circuit, switch 95 is closed when hydraulic piston 76 is at the top position, while switches 68 and 54 close as soon as positioning member 65 and transfer pusher 42, respectively, have withdrawn sufficiently from mold 66. Therefore, as soon as members 65 and 42 have withdrawn sufficiently, solenoid 78 is energized, setting the hydraulic motor in operation and causing ram 73 to descend and apply pressure on the material in mold cavity 69.

When ram 73 descends, projection 77a on piston rod 77 causes switch 95 to open. Therefore, it is necessary to provide a hold-in circuit for solenoid 78 to prevent the hydraulic motor from immediately retracting the ram. This is done by means of a solenoid 187, which is energized simultaneously with solenoid 78. The energizing of solenoid 187 moves a switch 188 to the upper position, completing a circuit from switches 153 and 154 through a conductor 189 to the upper contacts of switch 188 whereby conductor 189 is joined to conductor 172, thus providing a hold-in circuit for both of solenoids 78 and 187.

It will be noted that the lower contacts of switch 112 are in the closing circuit for the ram 73. This is to make it impossible for the hydraulic motor to be operated to cause the ram to descend while solenoid 109, which is a part of the pellet loading circuit, is energized. This is necessary to allow time for the molded part to be ejected from the mold and another heated pellet transferred to the mold. If it were not for switch 112, the ram would descend again immediately that switch 95 was closed at the top of the ram travel, inasmuch as the remainder of the control circuit for solenoid 78 remains operative until switch 148 is operated to recycle the entire control system.

It will be noted also that switch 125 in the circuit to timer 157 is open when solenoid 124 is energized during the pellet loading operation. This is to insure against the operation of the transfer pusher 42 and positioner 65 during the time that loading pusher 5 is in the preheating chamber. Also, this allows timer 157 to reset following the start of another cycle by the operation of switch 148, as explained subsequently.

Timer 157 is adjusted so that it moves contact member 176 from contacts 163 to contacts 177, opening the former and closing the latter, at a selected interval after the energizing of timer motor 158 and the coil of clutch 193. The opening of contacts 163 allows solenoid 165 to drop out and prepares the pellet transfer and positioning apparatus for another operation. In addition, the dropping out of solenoid 165 opens switch 169 and thus opens the control circuit for the ram motor, providing this control circuit has not been opened previously by switch 173. Normally, the control circuit for the ram motor is opened by switch 173, as described in detail subsequently. The closing of contacts 177 energizes solenoid 113 through a circuit which can be traced from contacts 177 through a conductor 178, a conductor 179, conductor 114, switches 117 and 118, conductor 119, the coil of solenoid 113 and conductor 120. When solenoid 113 is thus energized, it initiates the transfer of another preform or pellet from the stack to the preheating chamber 33 in the same manner as previously described for manual operation. That is, solenoid 113 closes switch 121, which energizes solenoid 13 to move the loading pusher 5 forward. The forward movement of the pusher closes switch 31, which energizes solenoid 124, opening the lower contacts of switch 117, thus de-energizing solenoid 113, opening switch 121 and de-energizing solenoid 13, which causes pusher 5 to return to its original position after having left a pellet in the preheating chamber.

It will be noted that the closing of contacts 177 also energizes solenoid 109 through a circuit including conductors 115 and 114. The energizing of solenoid 109 closes the upper contacts of switch 112 and thereby completes a current supply circuit in shunt to timer 157. This shunt circuit may be traced from main conductor 111 through switches 153 and 154, a conductor 195, switch 112, and a conductor 196 to the junction of conductors 178 and 179. The purpose of this shunt circuit is to allow sufficient time for the clutch 193 of timer 157 to reset, when it is subsequently de-energized, before the beginning of the next cycle. Clutch 193 is de-energized immediately after the completion of this shunt circuit around timer 157, by the opening of switch 125 by solenoid 124.

Solenoid 124 is a part of the pellet loading circuit, as explained previously, and it should be noted here that the hold-in circuit previously mentioned for 124 through switch 117 is provided by a circuit including conductors 196, 179, 115 and 114.

Switch 154 is included in the shunt circuit around timer 157 to prevent energizing timer 157 and another timer 181 when the loading push button 108 or the preheat push button 126 are used on manual operation, switch 154 not being closed unless switch member 104 is in contact with member 149 for automatic operation as previously explained.

When solenoid 113 is de-energized by the opening of switch 117 by solenoid 124, it closes switch 123, which energizes conductor 132 to timer 133 and a conductor 180 to timer 181. Some of the functions of timer 133 and its associated circuits, including the application of heat to the preform in the preheating chamber, were explained previously. Timer 133 also controls the curing time of the molded part and has other functions which are explained later. The function of timer 181, which is set approximately ½ second shorter than timer 133, is to de-energize solenoid 186 and cause ram 73 to retract by opening switch 173 in the operating circuit thereof.

Timer 181 is provided with a synchronous motor 182, which operates continuously as long as the control system of the machine is energized, being supplied through a circuit which can be traced from conductor 111 through conductor 135, a conductor 183, thence through motor 182 and through conductor 137 to conductor 110. When conductor 180 is energized by switch 123, it energizes the coil of a magnetic clutch 184 in timer 181 through a conductor 194 and conductor 139 to main conductor 110, causing the clutch to engage the shaft of motor 182 and start the timing cycle. This happens as soon as switch 32 in conductor 110 is closed by the return of loading pusher 5 to the retracted position. At a selected time after clutch 184 is energized, the timer closes contacts 185, which are connected to conductor 172, thus energizing solenoid 186. Solenoid 186 opens switches 160 and 173. The opening of switch 160 opens the circuit to motor 158 of timer 157, completing the cycle of this timer and allowing it to reset, to prepare the timer for the next cycle. It should be understood that there is a cam mechanism forming a part of timer 157 which must be allowed to reset by means of a spring to prepare the timer for another cycle. This is in addition to the resetting of the clutch 193, previously mentioned.

The opening of switch 173 de-energizes solenoid 78, causing hydraulic piston 76 to retract and return ram 73 to the open position. Simultaneously, the opening of switch 173 de-energizes solenoid 187, returning switch 188 to the lower position. This energizes solenoid 96, which opens air valve 97, creating a blast of air to eject the finished part from the machine and then clean and lubricate the mold.

Switch 32, which is opened by the movement of preform loading pusher 5 as soon as pusher 5 starts its movement, is provided to open conductor 110 when the pusher is in motion. This is to prevent the operation of the magnetic clutch 138 and the application of high frequency power to the preheating chamber until pusher 5 has retracted from the chamber. Clutch 138 controls the energy supply lines to generator 146, which means that the heating apparatus cannot be operated while pusher 5 remains in the preheating chamber.

Switch 70, which is opened by transfer pusher 42 as soon as it leaves its quiescent position, is provided to break conductor 110 as soon as pusher 42 starts to operate. When switch 70 is open, it prevents solenoid 13 and clutch 138 from being energized, which means that it is not possible for the generator 146 or pusher 5 to be energized. These insure, respectively, that no heat can be applied to the preheating chamber while pusher 42 is there, and that loader pusher 5 cannot enter the preheating chamber while member 42 is there.

As explained previously, switch 148 is opened momentarily by timer 133 acting through solenoid 147 at the conclusion of each heating cycle. When this occurs, solenoid 152 is de-energized, opening switches 153 and 154, which de-energizes all control circuits except for synchronous motors 134 and 182. This means that conductor 189 is de-energized whereby operating solenoid 78 for the hydraulic motor, and solenoid 187 which governs the air blast, will be de-energized if they have not previously been de-energized by the operation of timer 181. The "timed out" position of timer 181 is set approximately one-half second prior to timer 133, as mentioned previously; therefore, timer 133 serves as a secondary operating device for solenoids 78 and 187, in the event that these solenoids are not already de-energized. If solenoid 187 is de-energized before timer 133 times out, it means that the upper contacts of switch 188 will be open, and switch 95 will again be closed due to the opening of the clamping ram by solenoid 78, but the lower contacts of switch 112 will be held open to prevent the ram from closing until timer 133 times out. Both of timer clutches 184 and 138 are energized by the same switch 123, the difference in timer settings of one-half second being present to allow for variations in the "blow out" time in removing a molded part from the machine.

As soon as switch 148 is restored to the closed position, which occurs immediately as soon as the control system is de-energized as a result of the opening of this switch, the machine is ready to begin another cycle of operation. Inasmuch as heating timer 133 has just operated to initiate the operation of switch 148, a pellet is present in the preheating chamber at the proper temperature for molding and ready to be transferred to the mold cavity for the next molding operation.

It is necessary, for the successful high speed molding of thermosetting resins, that they be preheated to molding temperature and then molded quickly before the material has an opportunity to set, and this, in turn, means that automatic operation is essential. In an automatic molding machine for this purpose, the utilization of ultra high frequency energy for preheating a charge in accordance with my invention has numerous advantages over other well known heating means. First, it permits the introduction of heat several times more rapidly than other well known methods of heating, which aids materially in shortening the time of the over-all molding cycle. Secondly, since the charge is rapidly heated to molding temperature prior to being placed in the mold, a large percentage of ammonia, water and other vapors are given off while the charge is in the preheating chamber. This means that the curing time in the mold itself is greatly reduced, because it is not necessary to heat the material by conduction from the mold to drive off these vapors while the materials is in the mold. This also makes it possible to use a higher mold temperature to accelerate the cure without burning the molded part, and at the same time makes it possible to use a lower ram pressure because the material is in a plastic state when it enters the mold. The latter means that a smaller, less expensive press can be used, and that mold life is considerably increased. Moreover, the rapid transfer from the preheating chamber to the mold, which my invention provides, means that the material may be preheated to a higher temperature than would otherwise be possible before it is put in the mold. I have found that by preheating the pellets in the preheating chamber to approximately the same temperature as the mold, that I can successfully produce small molded parts, such as bases for radio tubes and the like, at a rate of approximately one piece every 6–8 seconds from conventional phenolic molding compounds.

While I have illustrated and described one preferred embodiment of my invention, many modifications thereof will occur to those skilled in the art and, therefore, it should be understood that I intend to cover, by the appended claims, all such modifications as fall within the true spirit and scope of my invention.

What I claim as new and desire to secure by Letters Patent of the United States is:

1. A molding machine for thermosetting plastic materials comprising means for holding a plurality of preforms of such a material in a substantially vertical stacked relationship, a high frequency preheating chamber having walls made of an electrically conducting material, said walls including one substantially horizontal wall forming a floor for said chamber, a pneumatically operated pusher to engage the lowermost of said preforms and move it into said preheating chamber by sliding it on to said floor, means for producing standing electromagnetic waves in said preheating chamber for a predetermined interval whereby said preform is heated, a heated mold, a second pneumatically operated pusher to engage said preform after it has been heated in said preheating chamber and transfer it to said mold by sliding it along said floor, pneumatically operated positioning means for accurately positioning said preform in said mold, a heated hydraulic ram for applying pressure to the preform in the mold for a predetermined interval whereby said preform is formed into a part having substantially the same shape as the mold, the molded part being cured and hardened by the heat of the mold and ram and the continuing pressure during said interval, means for ejecting the finished part from said mold, and means for removing said part from the machine.

2. An automatic compression molding machine for thermosetting plastic materials comprising a retainer for holding a plurality of circular pellets of such materials in a substantially vertical stacked relationship, a high frequency preheater having a substantially horizontal floor, a high frequency generator connected to said preheater, timing means, pusher means including a pneumatically operated rack and pinion mechanism actuated by a solenoid for engaging the lower one of said pellets and moving it into said preheater by sliding it onto said floor in response to a predetermined signal from said timing means, means including second timing means to cause said generator to furnish high frequency energy to said preheater for a predetermined interval whereby said pellet is heated, an electrically heated mold, pneumatically operated transfer means controlled by a solenoid responsively to a switch operated by said first timing means for engaging said pellet after it has been heated in said preheater and transfering it to said mold by sliding it along said floor, pneumatically operated positoining means for accurately positioning said preform in said mold, a hydraulic ram for applying pressure to the pellet in the mold for a predetermined interval whereby said pellet is formed into a part having substantially the same shape as the mold, the molded part being cured and hardened by the heat of the mold and the continuing pressure of the ram during said interval, means for ejecting the finished part from said mold, and means for removing said part from the machine.

3. An automatic molding machine for thermosetting plastic materials comprising means for holding a plurality of pellets of such a material in a substantially vertical stacked relationship, a resonant cavity preheating chamber having walls of electrically conductive material, said walls including one substantially horizontal wall forming a floor for said chamber, a pneumatically operated pusher to engage the lowermost of said pellets and move it into said preheating chamber and position it substantially centrally thereof by sliding it on to said floor, means including electric timing means for supplying ultra high frequency electrical energy to said preheating chamber for a predetermined interval whereby said preform is heated, an electrically heated mold, a pneumatically operated transfer pusher to engage said pellet after it has been heated in said preheating chamber and transfer it to said mold by sliding it along said floor, pneumatically operated positioning means for accurately positioning said pellet in said mold, a solenoid operated air valve actuated by said timing means for operating said transfer pusher and said positioning means, an electrically heated ram, means including an electrically controlled hydraulic motor for causing said ram to apply pressure to the pellet in said mold whereby said pellet is formed into a part having substantially the same shape as the mold, means responsive to said timing means for causing said ram to exert continuing pressure on the material in said mold for a predetermined interval during which the molded part is cured and hardened by the combination of pressure by the ram and the heat of the mold and ram, means for ejecting said part from said mold, and means for removing said part from the machine.

4. An automatic molding machine for thermosetting plastic materials comprising a retainer for holding a plurality of pellets of such materials in a substantially vertical stack, a resonant cavity preheating chamber formed by walls made of electrically conductive material, said walls including one substantially horizontal wall forming a floor for said chamber, an ultra high frequency generator coupled to said preheating chamber, a first electric timer, a solenoid controlled pneumatically operated chamber loading pusher responsive to said timer for engaging the lowermost of said pellets and moving it into said preheating chamber by sliding it on to the floor thereof, a second electric timer, means actuated by said second timer for causing said generator to deliver ultra high frequency energy to said preheating chamber for a predetermined interval whereby said pellet is heated, a heated mold, a pneumatically operated transfer pusher to engage said pellet after it has been heated in said preheating chamber and transfer it to said mold by sliding it along said floor, a pneumatically operated positioning pusher for accurately positioning said pellet in said mold in conjunction with said transfer pusher, means including a solenoid operated by said first timer for simultaneously actuating said transfer pusher and said positioning pusher, a heated ram, a solenoid controlled hydraulic motor responsive to said first timer for causing said ram to apply pressure to said preheated pellet in the mold for a predetermined interval whereby said pellet is formed into a part having substantially the same shape as the mold, the molded part being cured and hardened by the heat of the mold and ram and the pressure of the ram during said interval, said hydraulic motor being actuated by said first timer in predetermined relation with said chamber loading pusher whereby the next pellet is inserted in said preheating chamber to be heated while the previous pellet is curing in the mold, means including knockout pins actuated by said ram for ejecting the molded part from said mold, and compressed air means responsive to said second timer for removing the molded part from the machine and cleaning and lubricating said mold.

5. An automatic molding machine for thermosetting plastic material comprising a retainer for holding a plurality of preformed charges of such material in a substantially vertical stack, a preheating chamber having a substantially horizontal floor, a source of heat connected to said preheating chamber, a first intermittently operating synchronous timing device, a solenoid actuated pneumatically operated loading mechanism responsive to said first timing device including a pusher for engaging the lowermost of said preformed charges and moving it into said preheating chamber by sliding it onto said floor, means including a switch operated by said mechanism for causing said pusher to retract to its original position, a second continuously operating synchronous timing device, means responsive to said second timing device for causing said heating means to deliver heating energy to said preheating chamber for a predetermined interval whereby said preformed charge is heated, a heated mold having a cavity therein, a pneumatically operated transfer mechanism including a pusher to engage said preformed charge after it has been heated in said preheating chamber and transfer it to said mold cavity by sliding it along said floor, a pneumatically operated positioning device coacting with said transfer pusher for accurately positioning said charge in said mold cavity, means including a solenoid activated by said first timing device for simultaneously operating said transfer pusher and said positioning device relatively slowly until said transfer pusher engages said charge, means for causing said transfer pusher and said positioning device to move rapidly after such engagement, means including a switch operated by said transfer mechanism for causing said transfer pusher and said positioning device to retract to their original positions, a heated ram, a solenoid actuated hydraulic device responsive to said first timing device for causing said ram to apply pressure to the preheated charge in said mold cavity for a second predetermined interval whereby said pellet is formed into a part of substantially the same shape as the cavity, the formed part being cured and hardened by the heat of the mold and ram and the pressure of the ram during said second interval, means including a third continuously operating synchronous timing device for causing said ram to retract to its original postion at the conclusion of said second interval, means actuated by said ram for ejecting the formed part from said mold cavity, compressed air means responsive to said third timing device for removing the formed part from the machine and cleaning and lubricating said mold, and means responsive to said second timing device for initiating operation of said first timing device.

6. In an automatic molding machine having a heating chamber, a loading mechanism for inserting charges of material to be molded in said heating chamber by sliding them onto the floor thereof, a press comprising a fixed mold and a movable ram, and a transfer mechanism for transferring the heated charge from the heating chamber to the mold by sliding it along the floor of said chamber, a first timing mechanism, means responsive to said first timing mechanism for causing said transfer mechanism to transfer a heated charge from said heating chamber to said mold and then retract, means responsive to the retraction of said transfer mechanism for causing said ram to move into engagement with said charge in said mold and exert pressure thereon, means responsive to said first timing mechanism for actuating said loading mechanism to insert a fresh charge in said heating chamber, a second timing mechanism responsive to said first timing mechanism, means responsive to said second timing mechanism for applying heat to said fresh charge in said heating chamber for a predetermined interval, a third timing mechanism responsive to said first timing mechanism, means responsive to said third timing mechanism for causing said ram to retract after a second predetermined interval of shorter duration than said first interval, and means responsive to the retraction of said ram for ejecting the molded part from said press, said press then being ready to receive the fresh charge at the conclusion of said first interval.

7. A molding machine for thermosetting plastic materials comprising means for holding a plurality of preforms of such a material in a substantially vertical stacked relationship, a high frequency preheating chamber, a fluid pressure operated pusher for engaging the lowermost of said preforms and moving it into said preheating chamber by sliding it on to the floor thereof, means for supplying high frequency electrical energy to said preheating chamber for a predetermined interval whereby said preform is heated, a heated mold, a second fluid pressure operated pusher to engage said preform after it has been heated in said preheating chamber and transfer it to said mold by sliding it directly into said mold, a third fluid pressure operated pusher for engaging said preform and coacting with said second pusher to accurately position said preform in said mold, a heated fluid pressure operated ram for applying pressure to the preform in the mold for a predetermined interval whereby said preform is formed into a part having substantially the same shape as the mold, the molded part being cured and hardened by the heat of the mold and ram and the continuous pressure during said interval, means for ejecting the finished part from said mold, and means for removing said part from said machine.

References Cited in the file of this patent

UNITED STATES PATENTS

| | | |
|---|---|---|
| 2,228,614 | Soubier et al. | Jan. 14, 1941 |
| 2,274,603 | Herman et al. | Feb. 24, 1942 |
| 2,358,353 | Stacy | Sept. 19, 1944 |

(Other references on following page)

UNITED STATES PATENTS

| | | |
|---|---|---|
| 2,398,227 | Hubbert | Apr. 9, 1946 |
| 2,409,725 | Whitmore et al. | Oct. 22, 1946 |
| 2,445,742 | Hoch | July 20, 1948 |
| 2,467,440 | Meharg et al. | Apr. 19, 1949 |
| 2,471,739 | Gregg | May 31, 1949 |
| 2,480,313 | Alden | Aug. 30, 1949 |
| 2,485,523 | Ashbaugh | Oct. 18, 1949 |
| 2,495,415 | Marshall | Jan. 24, 1950 |
| 2,500,676 | Hall et al. | Mar. 14, 1950 |
| 2,500,752 | Hanson et al. | Mar. 14, 1950 |
| 2,504,109 | Dakin et al. | Apr. 18, 1950 |
| 2,537,193 | Shaw | Jan. 9, 1951 |
| 2,576,862 | Smith et al. | Nov. 27, 1951 |
| 2,620,172 | Jenett et al. | Dec. 2, 1952 |